(12) United States Patent
Wang et al.

(10) Patent No.: US 10,001,863 B2
(45) Date of Patent: Jun. 19, 2018

(54) PRESSURE SENSING STRUCTURE, PRESSURE SENSING PANEL AND PRESSURE SENSING DISPLAY DEVICE

(71) Applicants: BOE Technology Group Co., Ltd., Beijing (CN); Beijing BOE Optoelectronics Technology Co., Ltd., Beijing (CN)

(72) Inventors: Lei Wang, Beijing (CN); Rui Xu, Beijing (CN); Xiaochuan Chen, Beijing (CN); Ming Yang, Beijing (CN); Pengcheng Lu, Beijing (CN); Shengji Yang, Beijing (CN); Yingming Liu, Beijing (CN); Xiaoliang Ding, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 15/229,222

(22) Filed: Aug. 5, 2016

(65) Prior Publication Data
US 2017/0220169 A1    Aug. 3, 2017

(30) Foreign Application Priority Data
Jan. 29, 2016  (CN) .......................... 2016 1 0065810

(51) Int. Cl.
*G06F 3/041*    (2006.01)
*G06F 3/044*    (2006.01)

(52) U.S. Cl.
CPC ............ *G06F 3/0414* (2013.01); *G06F 3/041* (2013.01); *G06F 3/044* (2013.01); *G06F 3/0412* (2013.01); *G06F 2203/04105* (2013.01)

(58) Field of Classification Search
CPC ........ G06F 3/041; G06F 3/044; G06F 3/0414; G06F 3/0412; G06F 2203/04105
See application file for complete search history.

(56) References Cited

U.S. PATENT DOCUMENTS

2014/0354577 A1* 12/2014 Hanssen ................. G06F 3/044
                                                     345/174
2018/0032181 A1*  2/2018 Frey ....................... G06F 3/0414

* cited by examiner

*Primary Examiner* — Lixi C Simpson
(74) *Attorney, Agent, or Firm* — Westman, Champlin & Koehler, P.A.

(57) ABSTRACT

Embodiments of the present disclosure relate to a pressure sensing structure, a pressure sensing panel and a pressure sensing display device. The pressure sensing structure includes a first electrode, a second electrode, a common electrode, a capacitance detection unit and a pressure grade identification unit; a first insulating layer is provided between the first and second electrodes, a second insulating layer is provided between the second electrode and the common electrode; the first and/or the second electrodes include a plurality of sub-electrodes which are separated from each other; a plurality of through holes are provided in the first insulating layer, a conductive sliding cylinder is provided in each of the through holes, the sliding cylinder is connected to the first electrode and spaced apart from the second electrode by a gap in an initial unstressed state, the sliding cylinder slides to the second electrode along the through hole when being subjected to a pressure, which results in a change in capacitance value between the first and second electrodes and in turn a change in a capacitance value between the first electrode and the common electrode, wherein the gap value between the slide cylinders in the plurality of through holes and the second electrodes are classified into a plurality of grades; the capacitance detection unit is connected with the first electrode and the common electrode respectively so as to detect the capacitance value between the first electrode and the common electrode; the pressure grade identification unit determines the grade of user's pressure according to the detected capacitance value.

12 Claims, 4 Drawing Sheets

PRESSURE SENSING STRUCTURE, PRESSURE SENSING PANEL AND PRESSURE SENSING DISPLAY DEVICE

CROSS-REFERENCE TO RELATED APPLICATION

This application claims the benefit of Chinese Patent Application No. 201610065810.4 filed on Jan. 29, 2016 in the State Intellectual Property Office of China, the whole disclosure of which is incorporated herein by reference.

BACKGROUND OF THE INVENTION

Field of the Invention

The present invention relates to a field of pressure sensing and displaying technology, especially to a pressure sensing structure, a pressure sensing panel and a pressure sensing display device.

Description of the Related Art

A touch display panel generally comprises a display panel and a touch panel. When manufacturing a touch display panel, the basic solution is that firstly preparing a display panel and a touch panel, and then adhering the display panel and the touch panel together to form a touch display panel. Besides it, there is an On-cell solution and an In-cell solution. The solution so called On-cell is that forming a touch circuit on the surface of the display panel such that it is not necessary to performing an adhering process. It can reduce the thickness of the touch display panel compared with the first solution. The solution so called In-cell is that forming a touch circuit in a display panel (for example between an array substrate and a color filter substrate). The thickness of the touch display panel formed with such a solution is even smaller than that formed with the On-cell solution.

However, the touch display panel manufactured according to the above solution can only identify the coordinates in X direction and Y direction. That is, it can only determine the position where a user presses the screen, but it cannot determine the strength of the pressing force, which limits a further development and application of the touch operation.

SUMMARY OF THE INVENTION

The present invention has been made to overcome or alleviate at least one aspect of the above mentioned disadvantages. Embodiments of the present disclosure provide a pressure sensing structure, a pressure sensing panel and a pressure sensing display device, which can sense the grade of user's pressure.

Accordingly, it is an object of the present invention to provide a pressure sensing structure, comprising a first electrode, a second electrode, a common electrode, a capacitance detection unit and a pressure grade identification unit; the first electrode, the second electrode and the common electrode are arranged sequentially, and a first insulating layer is provided between the first and second electrodes, a second insulating layer is provided between the second electrode and the common electrode; the first and/or the second electrodes comprise a plurality of sub-electrodes which are separated from each other; a plurality of through holes are provided in the first insulating layer, a conductive sliding cylinder is provided in each of the through holes, the sliding cylinder is connected to the first electrode and spaced from the second electrode by a gap in an initial unstressed state, the sliding cylinder slides to the second electrode along the through hole when being subjected to a pressure, which results in that a capacitance value between the first and second electrodes and thus a capacitance value between the first electrode and the common electrode changes correspondingly, wherein gap values between the slide cylinders in the plurality of through holes and the second electrode are classified into a plurality of grades; the capacitance detection unit is connected with the first electrode and the common electrode respectively so as to detect a capacitance value between the first electrode and the common electrode; the pressure grade identification unit determines the grade of a user's pressure according to the detected capacitance value by the capacitance detection unit and according to correspondences between the capacitance values between the first electrode and the common electrode and the grades of the user's pressures.

Optionally, the first insulating layer is made of glass.

Optionally, the pressure sensing structure further comprises a reset unit for resetting the sliding cylinder to the initial unstressed state when a user does not press the sliding cylinder.

Optionally, in the initial unstressed state the gap values between the sliding cylinders in each of the through holes and the second electrodes are different from each other.

Optionally, in the initial unstressed state, the number of the through holes is larger than the number of the grades of the gap values between the sliding cylinders in each of the through holes and the second electrodes.

Optionally, the plurality of through holes are distributed uniformly in the first insulating layer.

According to another aspect of the present invention, there is provided a pressure sensing panel comprising a plurality of pressure sensing structure provided by the present disclosure.

According to another aspect of the present invention, there is provided a pressure sensing display device comprising a display panel and a pressure sensing panel provided by the present disclosure.

Optionally, the pressure sensing panel is located on a light emitting side of the display panel.

Optionally, the pressure sensing panel is located in the display panel.

Optionally, the display panel comprises a first and second substrates assembled to each other, a sharing electrode is provided on the first substrate as the common electrode of the pressure sensing structure, the first and second electrodes as well as the first and second insulating layers are arranged on one side of the common electrode.

Optionally, the first substrate comprises a glass substrate and a plurality of patterns formed on the glass substrate which includes the sharing electrode, and the glass substrate is the first insulting layer of the pressure sensing structure.

The embodiments of the present disclosure have advantages as follows,

The pressure sensing structure provided by the present disclosure detects, with the capacitance detection unit, change of the capacitance value between the first electrode and the common electrode with respect to that in the initial unstressed state, when the plurality of sliding cylinders, between which and the second electrode there are different gap values, is subjected to a pressure. Under this situation, the pressure grade identification unit may determine the grade of user's pressure according to the correspondences between the capacitance values between the first electrode and the common electrode and the grades of user's pressure.

The pressure sensing panel provided by the present disclosure comprises a plurality of pressure sensing structure provided by the present disclosure, which can identify the grade of user's pressure in respective regions of the pressure sensing panel.

The pressure sensing display device provided by the present disclosure comprises a pressure sensing panel provided by the present disclosure, which can sense the grade of user's pressure when a user presses the screen, so as to operate responsively according to the user's pressure, thus providing more operating experiences.

BRIEF DESCRIPTION OF THE DRAWINGS

The above and other features of the present invention will become more apparent by describing in detail exemplary embodiments thereof with reference to the accompanying drawings, in which.

LIST OF THE REFERENCE SIGNS

Figure 1:
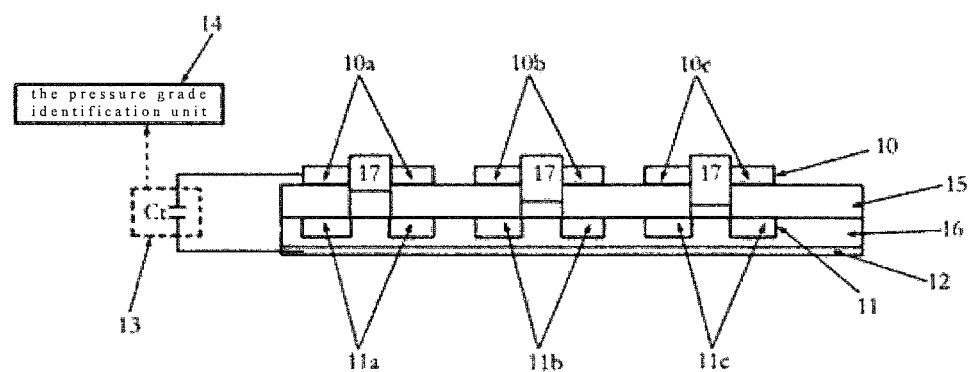
FIG. 1 is a schematic diagram of the pressure sensing structure in an embodiment of the present disclosure.

10: first electrode; 11: second electrode; 12: common electrode; 13: capacitance detection unit; 14: pressure grade identification unit; 15: first insulating layer; 16: second insulating layer; 17: sliding cylinder; 10a, 10b, 10c, 11a, 11b, 11c: sub-electrode.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

The present invention provides a pressure sensing structure. In an embodiment of the present invention, as shown in FIG. 1, the pressure sensing structure comprises a first electrode 10, a second electrode 11, a common electrode 12, a capacitance detection unit 13 and a pressure grade identification unit 14. The first electrode 10, the second electrode 11 and the common electrode 12 are arranged sequentially, and a first insulating layer 15 is provided between the first and second electrodes 10, 11, a second insulating layer 16 is provided between the second electrode 11 and the common electrode 12. Specifically, both the first and second electrodes 10, 11 comprise a plurality of sub-electrodes. The number of the sub-electrodes in the first electrodes 10 is equal to the number of the sub-electrodes in the second electrodes 11 and the first sub-electrodes and the second sub-electrodes are one-to-one correspondence with each other. For example, in the embodiment shown in FIG. 1, the first electrode 10 comprises three sub-electrodes 10a, 10b, 10c and the second electrodes 11 correspondingly comprises three sub-electrodes 11a, 11b, 11c. The common electrode 12 is an integral piece. A plurality of through holes are provided in the first insulating layer 15. Specifically, the number of the through holes is equal to the number of the sub-electrodes in the first electrode 10 and the number of the sub-electrodes in the second electrode 11 respectively. The plurality of through holes are one-to-one correspondence with the plurality of sub-electrode groups each consisting of a first sub-electrode in the first electrode 10 and a second sub-electrode in the second electrode 11 corresponding to each other, for example, a first sub-electrode 10a and a second sub-electrode 11a constitute a sub-electrode group. Each through hole is provided in the position where the corresponding sub-electrode group is located. A conductive sliding cylinder 17 is provided in each of the through holes, the sliding cylinder 17 is connected to the first electrode 10 and spaced apart from the second electrode 11 by a gap in an initial unstressed state, the sliding cylinder 17 slides to the second electrode 11 along the through hole when being subjected to a pressure, which results in that a capacitance value between the first and second electrodes 10, 11, and thus a capacitance value between the first electrode 10 and the common electrode 12 changes correspondingly. The gap values between the slide cylinders 17 in the plurality of through holes and the second electrode 11 are classified into a plurality of grades; the capacitance detection unit 13 is connected with the first electrode 10 and the common electrode 12 respectively so as to detect the capacitance value between the first electrode 10 and the common electrode 12; the pressure grade identification unit 14 determines the grade of user's pressure according to the detected capacitance value by the capacitance detection unit 13 and according to the correspondence between the capacitance value between the first electrode 10 and the common electrode 12 and the grade of user's pressure.

The pressure sensing structure further comprises a reset unit (not shown in the Figures) for resetting the sliding cylinder 17 to the initial unstressed state when a user does not press the sliding cylinder 17. Specifically, the reset unit may be a spring or a motor provided in the gap between the sliding cylinder 17 and the second electrode 11 for resetting the sliding cylinder 17 to its initial unstressed state by a spring force or directly driving the sliding cylinder 17 to move.

In the present embodiment, the plurality of sub-electrodes of the first electrode 10 form a plurality of capacitors with the common electrode 12, the capacitance value between the first electrode 10 and the common electrode 12 detected by the capacitance detection unit equals to a sum of the capacitances of the plurality of capacitors which are formed by the plurality of sub-electrodes of the first electrode 10 and the common electrode 12. Specifically, as the embodiment shown in FIG. 1, the capacitance value between the first electrode 10 and the common electrode 12 is set to be Ct, the capacitance values between the sub-electrodes 10a, 10b, 10c and the common electrode 12 are set to be Cta, Ctb, Ctc, respectively, then Ct, Cta, Ctb, Ctc satisfie the following relationship: Ct=Cta+Ctb+Ctc.

Figure 2:
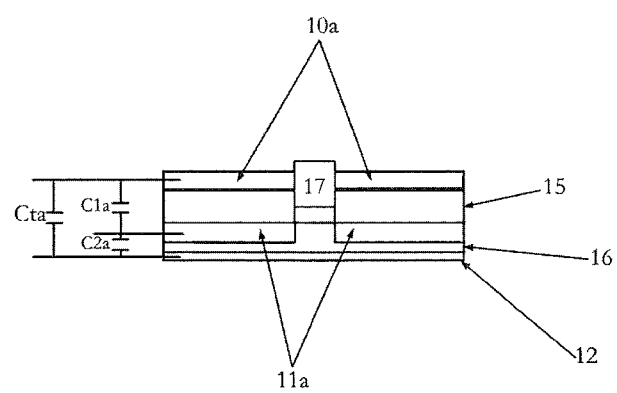
FIG. 2 is a partial diagram of the pressure sensing structure shown in FIG. 1.

With reference to FIG. 2, for example, studying one sub-electrode 10a of the first electrode 10. In the initial unstressed state, there is a gap between the sliding cylinder 17 and the sub-electrode 11a of the second electrode 11, which means that the sub-electrode 10a and the sub-electrode 11a are not connected to each other by the sliding cylinder 17. At this time, the sub-electrode 10a and the corresponding sub-electrode 11a constitute a capacitor, the capacitance value of which is C1a; while the sub-electrode 11a and the common electrode 12 constitute a capacitor, the capacitance value of which is C2a. According to the capacitive principle, the capacitance value Cta between the sub-electrode 10a and the common electrode 12 equals to a sum of C1a and C2a, that is Cta=C1a+C2a.

When the sliding cylinder 17 is subjected to a press, it moves towards the sub-electrode 11a along the through hole. When the sliding cylinder 17 is contacted with the sub-electrode 11a, the sub-electrode 10a and the sub-electrode 11a can be connected as one piece by the sliding cylinder 17 at this time, the capacitance value Cta between the sub-electrode 10a and the common electrode 12 actually equals to that between the sub-electrode 11a and the common electrode 12, that is, now Cta=C2a.

According to the above, the capacitance value between the sub-electrode 10a and the common electrode 12 changes from C1a+C2a to C2a, when the sliding cylinder 17 is subjected to a pressing force and contacts the sub-electrode 11a.

Similarly, as for another two sub-electrodes 10b, 10c of the first electrode 10, the capacitance value between the sub-electrodes 10b, 10c and the common electrode 12 will change with respect to the capacitance in the initial unstressed state, when the sliding cylinder 17 in the corresponding through holes contacts the corresponding sub-electrodes 11b, 11c under pressure. Specifically, in the initial unstressed state, the capacitance value of the capacitor formed by the sub-electrode 10b and the sub-electrode 11b is set to C1b, the capacitance value of the capacitor formed by the sub-electrode 11b and the common electrode 12 is set to C2b, then in the initial unstressed state, the capacitance value between the sub-electrode 10b and the common electrode 12 is Ctb=C1b+C2b; while the capacitance value between the sub-electrode 10b and the common electrode 12 is Ctb=C2b when the sliding cylinder 17 in the through hole corresponding to the sub-electrode 10b contacts the sub-electrode 11b under pressure. In the initial unstressed state, the capacitance value of the capacitor formed by the sub-electrode 10c and the sub-electrode 11c is set to C1c, the capacitance value of the capacitor formed by the sub-electrode 11c and the common electrode 12 is set to C2c, then in the initial unstressed state, the capacitance value between the sub-electrode 10c and the common electrode 12 is Ctc=C1c+C2c; while the capacitance value between the sub-electrode 10c and the common electrode 12 is Ctc=C2c when the sliding cylinder 17 in the through hole corresponding to the sub-electrode 10c contacts the sub-electrode 11c under pressure.

According to the above, the sliding cylinder 17 in respective through hole is kept in the initial unstressed state when the pressure sensing structure is not pressed. Under such a situation, the capacitance value Ct between the first electrode 10 and the common electrode 12 may be represented by the following equation:

$$Ct=C1a+C2a+C1b+C2b+C1c+C2c$$

In the present embodiment, the gap values between the sliding cylinders 17 in respective through holes and the second electrode 11 are classified into a plurality of grades, which means that the force which is required to apply to the pressure sensing structure for the sliding cylinder 17 and the second electrode 11 to contact with each other, or the travel of the deformation of the pressure sensing structure when it is pressed is correspondingly classified into a plurality of grades, which correspond to the plurality of gap values. Specifically as shown in FIG. 1, the degree of deformation of the pressure sensing structure is capable of making the sliding cylinder 17 in the through hole corresponding to the sub-electrode 10c contact with the sub-electrode 11c when the force applied to the pressure sensing structure reaches the first grade. At this time, the capacitance Ctc between the sub-electrode 10c and the common electrode 12 satisfies relationship: Ctc=C2c, and the capacitance Ct between the first electrode 10 and the common electrode 12 satisfies relationship: Ct=C1a+C2a+C1b+C2b+C2c. The degree of deformation of the pressure sensing structure is capable of making the sliding cylinder 17 in the through hole corresponding to the sub-electrode 10b contact with the sub-electrode 11b when the force applied to the pressure sensing structure is increased and reaches the second grade. At this time, the capacitance Ctb between the sub-electrode 10b and the common electrode 12 satisfies relationship: Ctb=C2b, and the capacitance Ct between the first electrode 10 and the common electrode 12 satisfies relationship: Ct=C1a+C2a+C2b+C2c. The degree of deformation of the pressure sensing structure is capable of making the sliding cylinder 17 in the through hole corresponding to the sub-electrode 10a contact with the sub-electrode 11c when the force applied to the pressure sensing structure is increased and reaches the third grade. At this time, the capacitance Cta between the sub-electrode 10a and the common electrode 12 satisfies relationship: Cta=C2a, and the capacitance Ct between the first electrode 10 and the common electrode 12 satisfies relationship: Ct=C2a+C2b+C2c. According to above discussion, there is a one-to-one correspondence as shown in the table 1 below between the capacitance value Ct between the first electrode 10 and the common electrode 12 and the pressure applied on the pressure sensing structure. Thus, the pressure grade identification unit 14 can determine the pressure grade by which the pressure sensing structure is pressed according to the relationship shown in the table 1 below, after the capacitance detection unit 13 detects the capacitance value Ct between the first electrode 10 and the common electrode 12.

Table 1 the correspondence (1) between the capacitance Ct between the first electrode 10 and the common electrode 12 and the pressure grade.

| capacitance value Ct | pressure grade |
| --- | --- |
| C2a + C2b + C2c | pressure of the third grade |
| C1a + C2a + C2b + C2c | pressure of the second grade |
| C1a + C2a + C1b + C2b + C2c | pressure of the first grade |
| C1a + C2a + C1b + C2b + C1c + C2c | the initial unstressed state |

In the present embodiment, the first insulating layer 15 may be made of glass which makes the pressure sensing structure act as a sensing panel, such that it may be provided in the display device and the like in an external hanging way without modifying the structure of the display panel. Specifically, when preparing the pressure sensing structure, it is possible to use a glass plate as a substrate, and form the first electrode 10 and the second electrode 11 on two sides of the substrate respectively, then form through holes at the corresponding positions, and then form the second insulating layer 16 and the common electrode 12 sequentially on the side where the second electrode 11 is located. Specifically, in the initial unstressed state, the number of the through holes is larger than the number of the grades of the gap values between the sliding cylinders 17 in each of the through holes and the second electrodes 11. For example, in FIG. 3, each circle represents a through hole, and the number in the circle represents the grade of the gap value between the sliding cylinder 17 in the through hole and the second electrode 11. It can be seen from FIG. 3 that the number of the through holes in the first insulating layer 15 is 7, while the grades of the gap values between the sliding cylinders 17 and the second electrode 11 only comprise "1", "2", "3", "4" of four grades. Such an arrangement is intended to provide a number of sliding cylinders 17 in the plurality of through holes of the pressure sensing structure which have the same grade of the gap value with respect to the second electrode 11, such that there is always a sliding cylinder 17 to be provided in a pressed region which corresponds to a pressure grade, when a user presses at different locations of the pressure sensing structure with different press force, which can optimize detection performance and improve detection accuracy.

Figure 3:
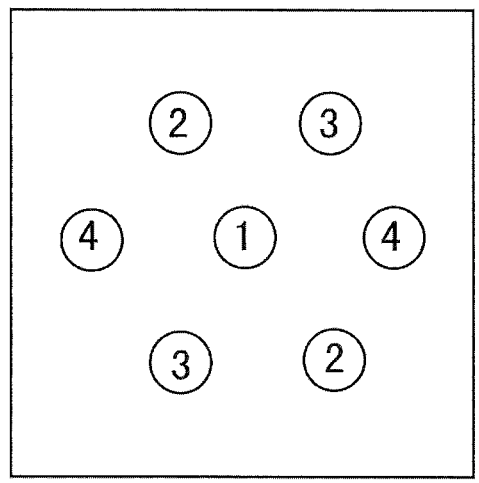
FIG. 3 is a diagram of an arrangement of the through holes in the first insulating layer.
Figure 4:
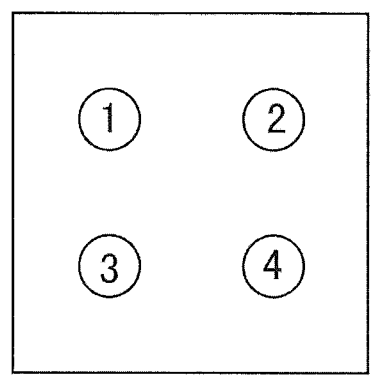
FIG. 4 is a diagram of another arrangement of the through holes in the first insulating layer.

Of course, in the present embodiment, as shown in FIG. 4, it is also impossible to provide that the gap values between the sliding cylinders 17 in each of the through holes and the second electrode 11 are all different from each other. That is to say, there is only a sliding cylinder 17 corresponding to each grade of gap value, such that the number of the grades of the gap values can be increased as much as possible in comparison with the embodiment as shown in FIG. 3, when there is a given number of through holes in the first insulating layer 15. Therefore, identification of more grades of pressure can be achieved.

As shown in FIGS. 3 and 4, the plurality of through holes are distributed uniformly in the first insulating layer so as to optimize detection performance and improve detection accuracy.

It should be noted that, in the present embodiment, the second electrode 11 is not necessary to include a plurality of sub-electrodes and the plurality of sub-electrodes are not necessary to be one-to-one correspondence to respective sub-electrode of the first electrode 10. In the embodiments except the embodiment as shown in FIG. 1, the second electrode 11 may also be one-piece element, or the second electrode 11 comprises a plurality of sub-electrodes which are not in one-to-one correspondence with the sub-electrodes of the first electrode 10. For example, the correspondence between the capacitance Ct between the first electrode 10 and the common electrode 12 and the pressure grades are shown in table 2 as follows, when the second electrode 11 is a one-piece element and the first electrode 10 still comprises three electrodes 10a, 10b and 10c. According to the table 2, an one-to-one correspondence is maintained between the capacitance value Ct and the pressure grades. Thus, the pressure sensing structure at this time can also achieve the identification of the pressure grade, which is similar to the embodiment shown in FIG. 1. The case that the second electrode 11 comprises a plurality of sub-electrodes which are not in one-to-one correspondence with respective sub-electrodes of the first electrode 10 is similar to that mentioned above, description is omitted.

Table 2 the correspondence (2) between the capacitance Ct between the first electrode 10 and the common electrode 12 and the pressure grade.

| capacitance value Ct | pressure grade |
| --- | --- |
| C2 | pressure of the third grade |
| C1a + C2 | pressure of the second grade |
| C1a + C2a + C2 | pressure of the first grade |
| C1a + C1b + C1c + C2c | the initial unstressed state |

Note:
C2 is the capacitance value of the capacitor formed by the second electrode 11 and the common electrode 12.

Further, in the pressure sensing structure provided by the present invention, it is also possible that the first electrode 10 is a one-piece element, the second electrode 11 comprises a plurality of sub-electrode, which also can maintain a one-to-one correspondence between the capacitance value Ct between the first electrode 10 and the common electrode 12 and the pressure grade, achieving the identification of the pressure grade, the principle of which is similar to that mentioned above, description is omitted.

In summary, the pressure sensing structure provided by the present disclosure detects, with the capacitance detection unit 13, change of the capacitance value between the first electrode 10 and the common electrode 12 with respect to that in the initial unstressed state, when the plurality of sliding cylinders 17, between which and the second electrode there are different gap values, is subjected to a pressure. Under this situation, the pressure grade identification unit 14 may determine the grade of user's pressure according to the correspondence between the capacitance value between the first electrode 10 and the common electrode 12 and the grade of user's pressure.

Figure 5:
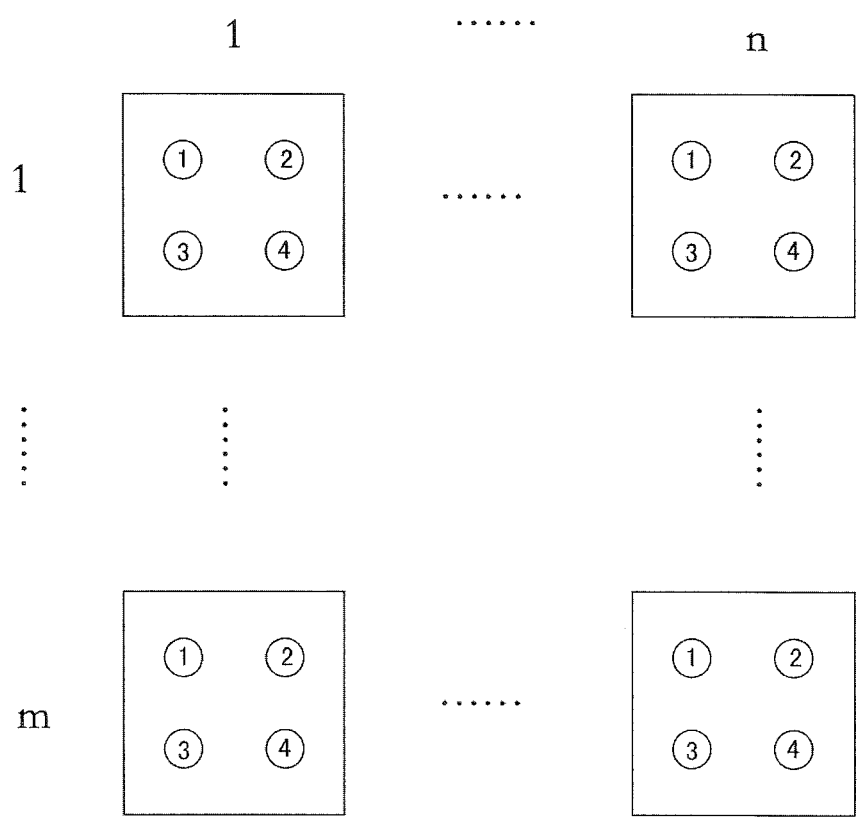
FIGS. 5 and 6 are the diagrams of respective pressure sensing structure in the pressure sensing panel in an embodiment of the present disclosure.
Figure 6:
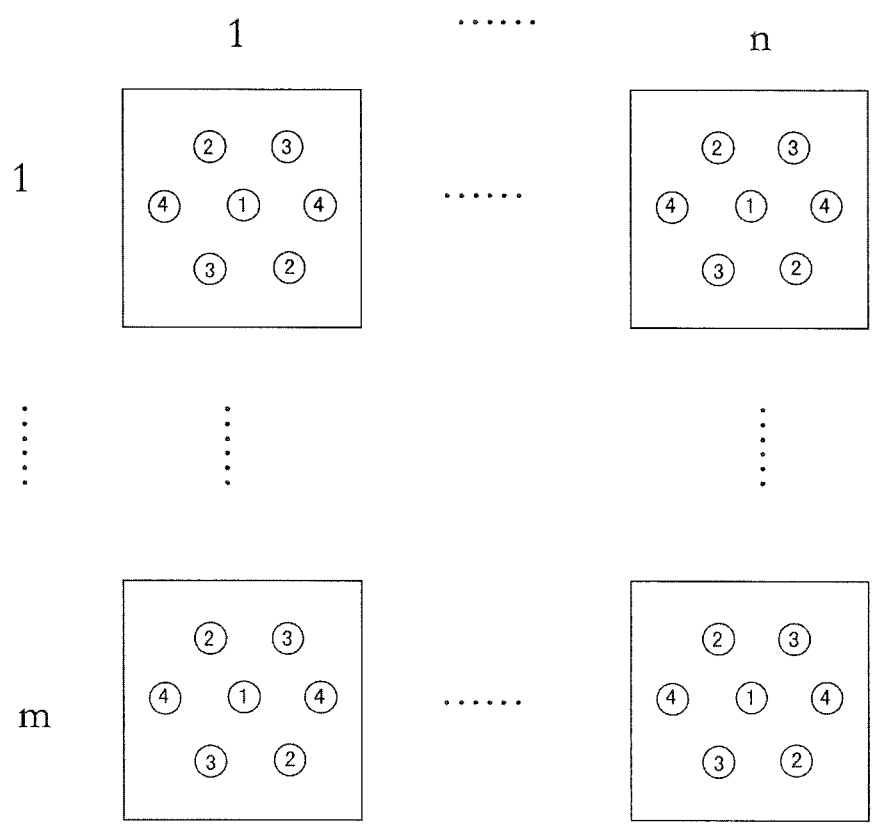

An embodiment of the present invention also provides a pressure sensing panel. In the embodiment provided by the present invention, the pressure sensing panel comprises a plurality of pressure sensing structures provided by the present disclosure. As shown in FIGS. 5 and 6, the pressure sensing panel comprises n columns and m rows of pressure sensing structures.

The pressure sensing panel provided by the present disclosure comprises a plurality of pressure sensing structures, which can identify the grade of user's pressure in respective regions of the pressure sensing panel.

An embodiment of the present invention provides a pressure sensing display device. In the embodiment provided by the present invention, the pressure sensing display device comprises a display panel and a pressure sensing panel provided by the present disclosure.

Specifically, the pressure sensing panel may be externally provided to the display panel. For example, the pressure sensing panel may be provided on a light emitting side of the display panel. Further, it may be provided inside the display panel.

The display panel comprises a first and second substrates assembled to each other, a sharing electrode is provided on the first substrate. The sharing electrode is used as the common electrode of the pressure sensing structure when the pressure sensing panel is provided inside the display panel, and he first and second electrodes as well as the first and second insulating layers are arranged on one side of the common electrode, which forms respective components of the pressure sensing structure. Further, the first substrate comprises a glass substrate and a plurality of patterns formed on the glass substrate which includes the sharing electrode, and the glass substrate is used as the first insulting layer of the pressure sensing structure, which can avoid providing a separate first insulating layer, reduce the cost and manufacturing steps.

In summary, the pressure sensing display device provided by the present disclosure employs a pressure sensing panel provided by the present disclosure, which can sense the grade of user's pressure when a user presses the screen, so as to respond respective operations according to user's pressure, providing a richer operating experience.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:
1. A pressure sensing structure, comprising a first electrode, a second electrode, a common electrode, a capacitance detection unit and a pressure grade identification unit, wherein the first electrode, the second electrode and the common electrode are arranged sequentially, and a first insulating layer is provided between the first and second electrodes, a second insulating layer is provided between the second electrode and the common electrode; the first electrode and/or the second electrode comprise a plurality of sub-electrodes which are separated from each other;

a plurality of through holes are provided in the first insulating layer, a conductive sliding cylinder is provided in each of the through holes, the sliding cylinder is connected to the first electrode and spaced apart from the second electrode by a gap in an initial unstressed state, the sliding cylinder slides to the second electrode along the through hole when being subjected to a pressure, which results in a change in capacitance value between the first and second electrodes and in turn a change in capacitance value between the first electrode and the common electrode, wherein the gap values between the slide cylinders in the plurality of through holes and the second electrodes are classified into a plurality of grades;

the capacitance detection unit is connected with the first electrode and the common electrode respectively so as to detect the capacitance value between the first electrode and the common electrode; and the pressure grade identification unit determines the grade of user's pressure according to detected capacitance value by the capacitance detection unit and according to the correspondence between grades of user's pressure and capacitance values between the first electrode and the common electrode.

2. The pressure sensing structure according to claim 1, wherein the first insulating layer is made of glass.

3. The pressure sensing structure according to claim 1, wherein the pressure sensing structure further comprises a reset unit for resetting the sliding cylinder to the initial unstressed state when a user does not press the sliding cylinder.

4. The pressure sensing structure according to claim 1, wherein in the initial unstressed state, the gap values between the sliding cylinders in respective through holes and the second electrode are different from each other.

5. The pressure sensing structure according to claim 1, wherein in the initial unstressed state, the number of the through holes is larger than the number of the grades of the gap values between the sliding cylinders in respective through holes and the second electrode.

6. The pressure sensing structure according to claim 1, wherein the plurality of through holes are distributed uniformly in the first insulating layer.

7. A pressure sensing panel, comprising a plurality of pressure sensing structure according to claim 1.

8. A pressure sensing display device, comprising a display panel and a pressure sensing panel according to claim 7.

9. The pressure sensing display device according to claim 8, wherein the pressure sensing panel is located on a light emitting side of the display panel.

10. The pressure sensing display device according to claim 8, wherein the pressure sensing panel is located inside the display panel.

11. The pressure sensing display device according to claim 10, wherein the display panel comprises a first and second substrates assembled to each other, a sharing electrode is provided on the first substrate as the common electrode of the pressure sensing structure, the first and second electrodes as well as the first and second insulating layers are arranged on one side of the common electrode.

12. The pressure sensing display device according to claim 11, wherein the first substrate comprises a glass substrate and a plurality of patterns formed on the glass substrate which includes the sharing electrode, and the glass substrate is the first insulting layer of the pressure sensing structure.

* * * * *